United States Patent
Yasui

(10) Patent No.: US 7,048,326 B2
(45) Date of Patent: May 23, 2006

(54) FRONT BODY STRUCTURE OF MOTOR VEHICLE

(75) Inventor: Ken Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 10/960,359

(22) Filed: Oct. 6, 2004

(65) Prior Publication Data

US 2005/0077755 A1    Apr. 14, 2005

(30) Foreign Application Priority Data

Oct. 8, 2003 (JP) ............................ 2003-349293

(51) Int. Cl.
*B60K 7/00* (2006.01)

(52) U.S. Cl. ........................ 296/203.02; 296/193.09; 296/203.01

(58) Field of Classification Search .......... 296/203.02, 296/193.09, 203.01
See application file for complete search history.

(56) References Cited

U.S. PATENT DOCUMENTS

| | | | |
|---|---|---|---|
| 3,595,335 A * | 7/1971 | Wessells et al. | 296/187.09 |
| 6,068,330 A * | 5/2000 | Kasuga et al. | 296/187.09 |
| 6,216,810 B1 * | 4/2001 | Nakai et al. | 296/193.09 |
| 6,237,990 B1 * | 5/2001 | Barbier et al. | 296/203.01 |
| 6,250,710 B1 * | 6/2001 | Matsuzaki | 296/203.02 |
| 6,287,442 B1 * | 9/2001 | Tarahomi | 204/479 |
| 6,357,821 B1 * | 3/2002 | Maj et al. | 296/203.02 |
| 6,443,518 B1 * | 9/2002 | Rohl et al. | 296/203.01 |
| 6,619,730 B1 * | 9/2003 | Porner | 296/203.02 |
| 6,729,008 B1 * | 5/2004 | Nishijima | 296/203.02 |
| 6,729,424 B1 * | 5/2004 | Joutaki et al. | 296/203.02 |
| 6,793,275 B1 * | 9/2004 | Chernoff et al. | 296/203.02 |
| 6,846,038 B1 * | 1/2005 | White et al. | 296/203.02 |
| 6,893,065 B1 * | 5/2005 | Seksaria et al. | 296/203.02 |
| 6,893,081 B1 * | 5/2005 | Sasano et al. | 296/203.02 |
| 6,923,495 B1 * | 8/2005 | Kishikawa et al. | 296/203.02 |
| 6,938,948 B1 * | 9/2005 | Cornell et al. | 296/203.02 |
| 6,948,769 B1 * | 9/2005 | Borkowski et al. | 296/203.02 |
| 2005/0134092 A1 * | 6/2005 | Lazzeroni | 296/203.01 |
| 2005/0206200 A1 * | 9/2005 | Tazaki et al. | 296/203.02 |

FOREIGN PATENT DOCUMENTS

JP      09-002327      1/1997

* cited by examiner

*Primary Examiner*—Kiran B. Patel
(74) *Attorney, Agent, or Firm*—Hamre, Schumann, Mueller & Larson, P.C.

(57) ABSTRACT

In a front body structure including a bulk head 25 for supporting the tip 24 of a hood 16 covering an engine room 18 of a motor vehicle 11 and fenders 27, 27 covering the upper part of front wheels 26, 26, the left and right ends 33, 34 of the bulk head 25, after bent backward of a vehicle body, are connected to the fenders 27, 27 to adjust the shape of the front of the vehicle body by the bulk head 25, and when viewed in a plan, V-shape portions are formed at connecting portions between the ends of the bulk head and the fenders so that each of the V-shape portions is covered with each of eaves 36 extended from the fender and bulk head.

2 Claims, 6 Drawing Sheets

FRONT BODY STRUCTURE OF MOTOR VEHICLE

BACKGROUND OF THE INVENTION

This invention relates to a front body structure of a motor vehicle.

The front body of the motor vehicle is provided in front of a passenger room to have a function of attaching mainly an engine and a front wheel suspension system. The front body is also provided with fenders forming the appearance design of front wheels.

A previously known front body structure has fenders with a new design and a shock absorbing function (for example, Patent Reference 1).

Patent Reference 1: JP-A-9-2327 (page 4, FIG. 3).

Referring to FIG. 6, an explanation will be given of the front body structure disclosed in Patent Reference 1.

FIG. 6 is a view for explaining the basic configuration of a prior art. A conventional front body structure 101 includes a reinforcement member 103 secured to a framework 102, a front fender panel 104 and hood 105 provided to the outside of the reinforcement member 103 (having a side wall 106), and a head lamp 107 arranged on the front end of the hood 105. A secant line 108 is formed by the edge of the side wall 106 of the hood 105 and the edge of the front fender 105. By forming the secant line 108 on the same line as the edge of the front pillar 109, new accent can be made. The shocking load applied to the upper portion of the front end of the hood 105 in a direction of arrow A can be absorbed by the reinforcement member 103.

In the front body structure disclosed in Patent Reference 1, however, when a downward pressing load is applied to the corner 112 of the front end of the hood 105 in a direction of arrow B, the corner 112 is likely to be deformed because it is not supported by the reinforcement member 103. Even if the corner 112 is formed by extending the front fender panel 104, it is likely to be deformed. Particularly, if the head lamp 107 is designed to be rounded at the corner of a vehicle body, otherwise the corner 112 located above the head lamp 107 is formed in a rounded design, it is difficult to directly support the corner 112 by the reinforcement member 103 and radiator support member (bulk head) 113, thereby making it difficult to assure the rigidity of the corner 112. However, if the thickness of the plate forming the corner 112 is increased, the weight of the corner 112 increases, thereby increasing the production cost.

SUMMARY OF THE INVENTION

This invention intends to assure the rigidity of a fender tip in a simple structure without changing the appearance design of a fender of a motor vehicle and the plate thickness of the fender.

The invention described in aspect 1 is a front body structure including a bulk head for supporting the tip of a hood covering an engine room of a motor vehicle and fenders covering the upper part of front wheels, characterized in that the left and right ends of the bulk head, after bent backward of a vehicle body, are connected to the fenders to adjust the shape of the front of the vehicle body by the bulk head, and when viewed in a plan, V-shape portions are formed at connecting portions between the ends of the bulk head and the fenders so that each of the V-shape portions is covered with each of the eaves extended from the fender and bulk head.

In the invention described in aspect 1, the left and right ends of the bulk head, after bent backward of a vehicle body, are connected to the fenders to adjust the shape of the front of the vehicle body by the bulk head, and when viewed in a plan, V-shape portions are formed at connecting portions between the ends of the bulk head and the fenders so that each of the V-shape portions is covered with each of eaves extended from the fender and bulk head. Because of such a configuration, the eave receives load applied to the fender tip from above while it supports the rear of the fender tip located at the V-shape portion. As a result, the rigidity of the fender tip 63 can be assured in a simple structure without changing the appearance design and plate thickness of the fender 27 of the motor vehicle 27.

Further, in accordance with the front body structure according to this invention, the eave facilitates positioning between the head lamp and the fender. Specifically, since the positioning convexes on the side of the head lamp are fit in the positioning slots of the eave, the position of the fender relative to the head lamp is automatically determined, thereby shortening the working time required for alignment of the fender.

Further, in accordance with the front body structure according to this invention, the gap between the fender and the hood located at the V-shape portion is sealed, thereby preventing invasion of wind during vehicle running. As a result, the hot wind within the engine room does not flow toward the inlet of introducing the outside air of an air conditioner, thereby preventing flow-in of the hot wind.

In addition, the gap between the fender and the hood located at the V-shape portion is sealed by the eave, thereby preventing leakage of light from the head lamp located beneath the fender.

Further, in accordance with the front body structure according to this invention, since the rear of the hood located at the V-shape portion is supported by the eave, even if abnormal force is applied when the hood is closed, interference between the hood and the head lamp can be prevented more surely.

DETAILED DESCRIPTION OF THE PREFERRED EMBODIMENTS

Figure 1:
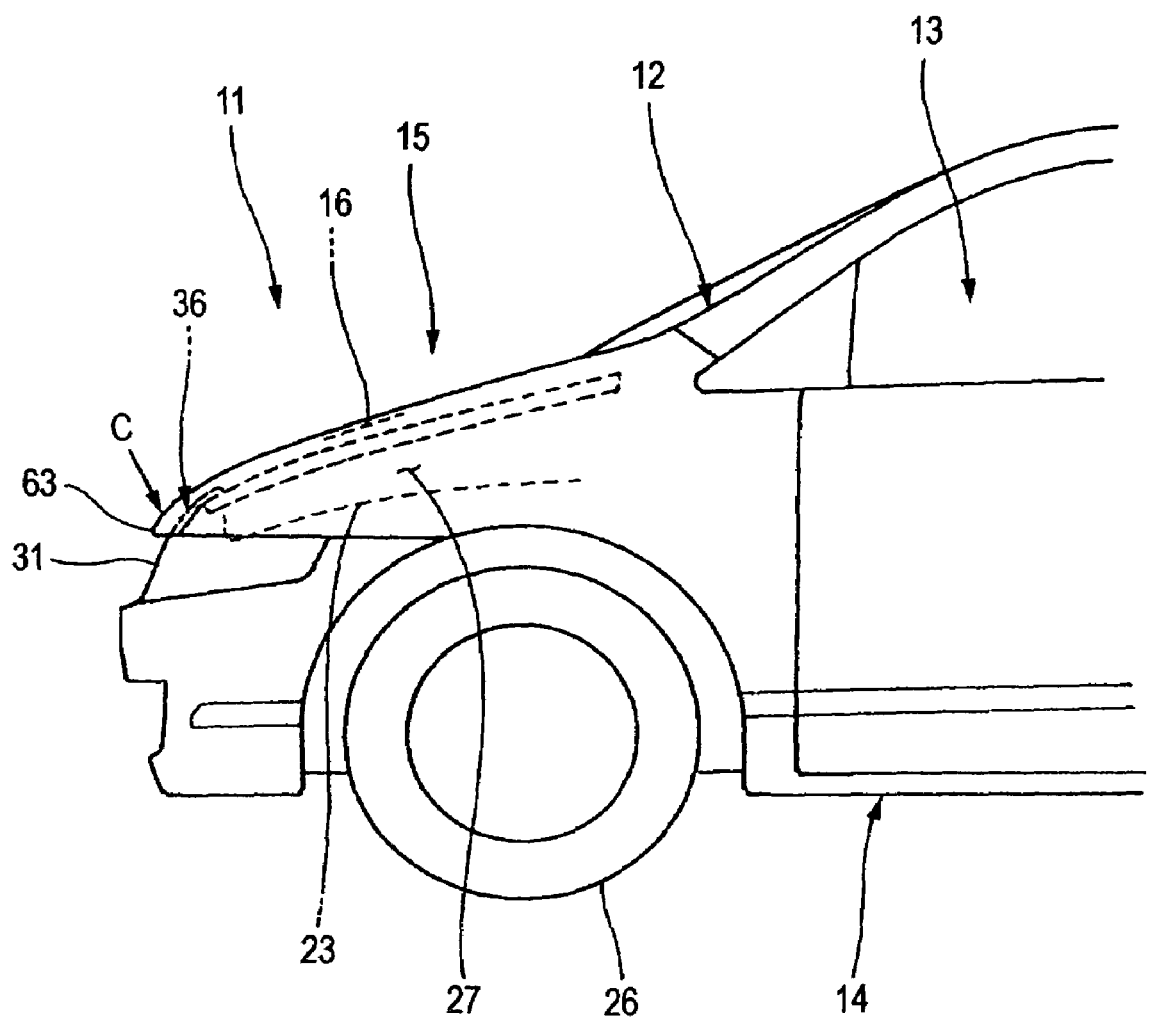
FIG. 1 is a front side view of a motor vehicle in which the front body structure according to this invention is adopted.

Now referring to the attached drawings, an explanation will be given of the best mode for carrying out the invention. Incidentally, it should be noted that the drawing is seen in a sense of reference symbols.

FIG. 1 is a front side view of a motor vehicle which adopts the front body structure according to this invention. The motor vehicle includes a vehicle body 12. The vehicle body 12 includes an under body 14 which constitutes the floor of a passenger room 13 and a front body structure 15 provided in front of the passenger room 13 and linked to the front portion of the under body 14. Reference numeral 16 denotes a hood.

Figure 2A:
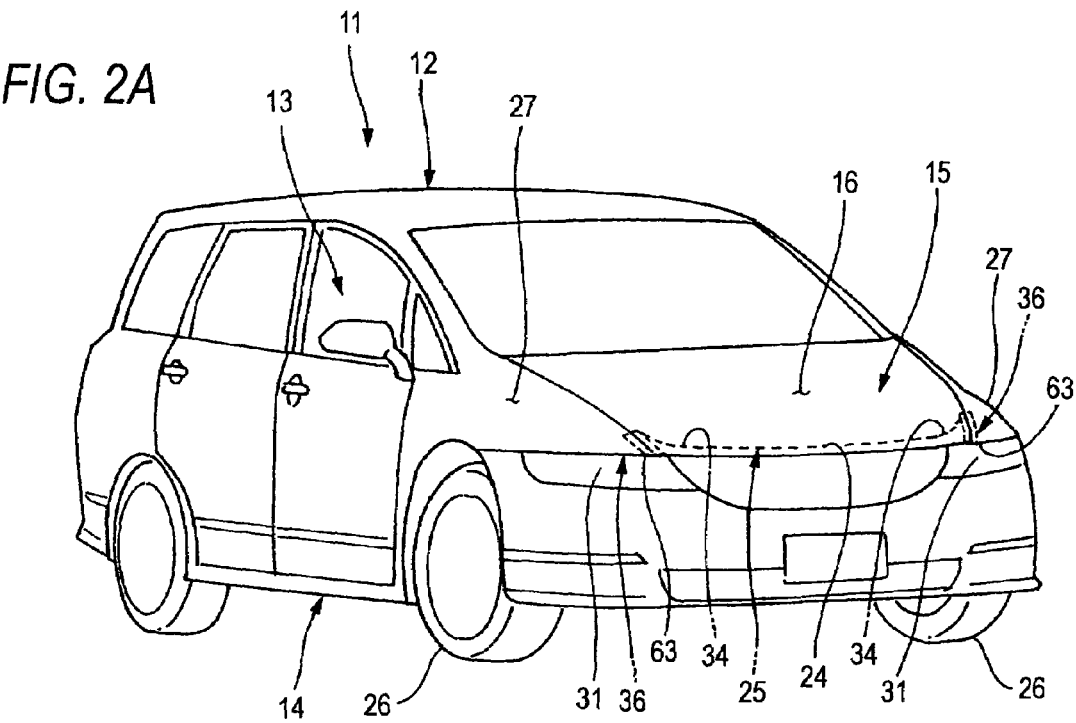
FIGS. 2A and 2B are perspective views of a motor vehicle in which the front body structure according to this invention is adopted.
Figure 2B:
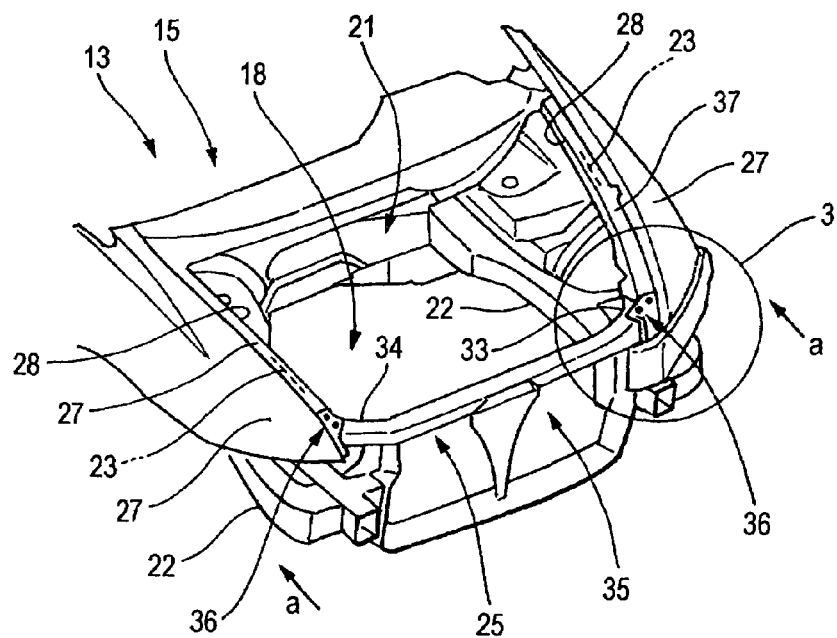

FIGS. 2A and 2B are perspective views of a motor vehicle which adopts the front body structure according to this invention.

As seen from FIG. 2A, the motor vehicle 11 includes head lamps 31, 31 arranged on the lower side of the front of fenders 27, 27.

As seen from FIG. 2B, a front body structure 15 includes a dashboard 21 arranged between a passenger room 13 and an engine room 18; front side frames 22, 22; upper members 23, 23 arranged above the front side frames 22, 22; a bulk head 25 attached to the front ends of the front side frames 22, 22 and upper members 23, 23 and supporting the tip 24 (FIG. 2A) of the hood 16 (FIG. 2A); and fenders 27, 27 covering the upper part of front wheels 26, 26 (FIG. 2A attached to the front side frames 22, 22 and making the appearance design. The fenders 27, 27 have a plate thickness equal to that of existing fenders.

The front body structure 15 also a structure in which the left and right ends 33, 34 of the bulk head 25, after bent as indicated in arrows a, a, backward of the vehicle body, are connected to both the upper members 23, 23 and fenders 27, 27 to adjust the shape of the front 35 of the vehicle body by the bulk head 25 and upper members 23, 23, and further the fenders 27, 27 and bulk head 25 are equipped with eaves 36, 36. Reference numeral 37 denotes one of covers attached to the edges 28, 28 of the fenders 27, 27.

Figure 3:
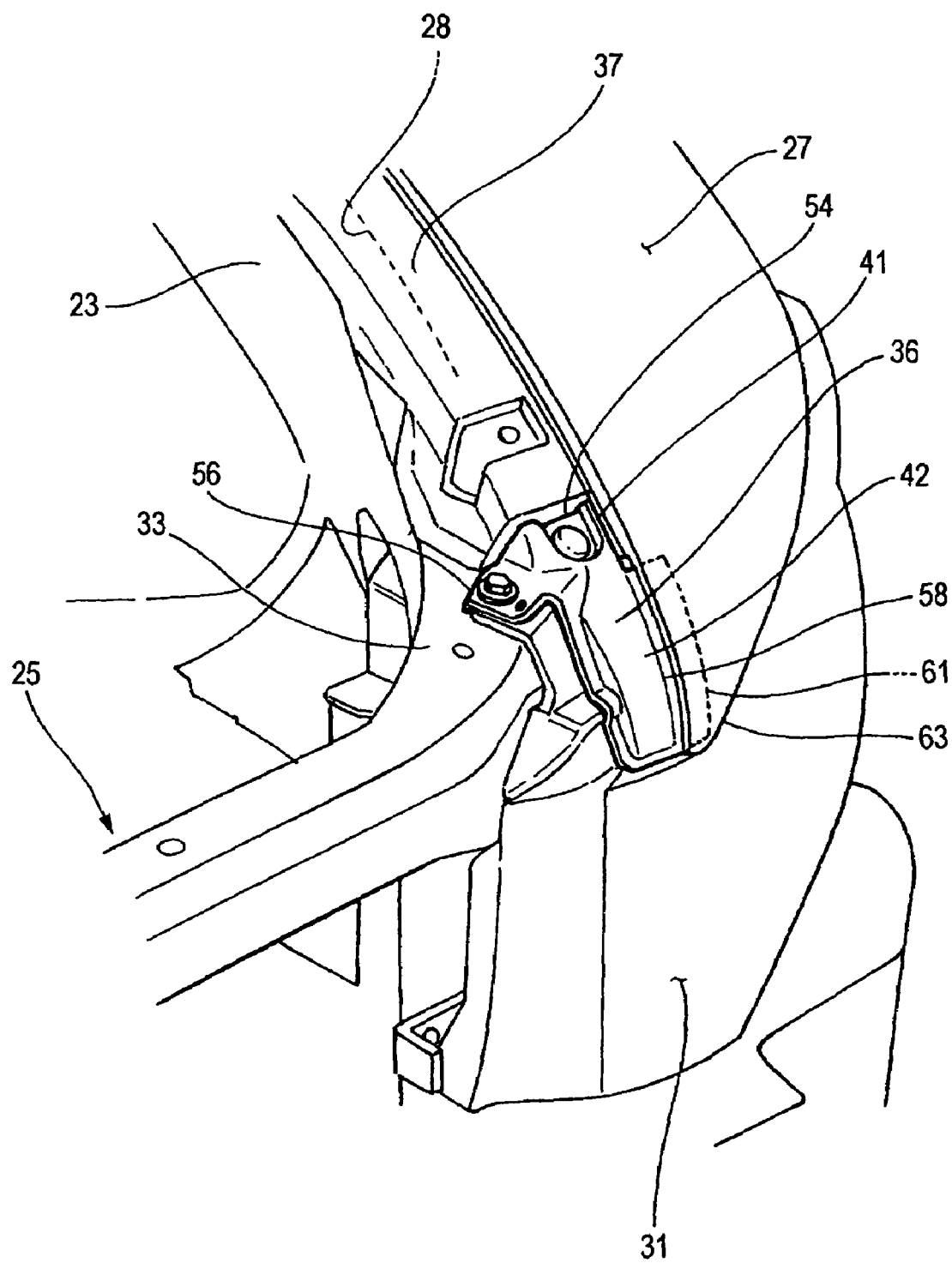
FIG. 3 is a detailed view of a part 3 of FIG. 2B.

FIG. 3 is a view showing the details of a part 3 in FIG. 2B.

The eave 36 includes a fixed portion 41 and a supporting portion 42 linked thereto. The eave 36 is attached to the left end 33 of the bulk head 25 and edge 28 of the fender 27. The eave 36 supports the fender 27 from the rear side by the supporting portion 42 located on the rear side of the fender 27. The details of the eave 36 will be described later.

Figure 4:
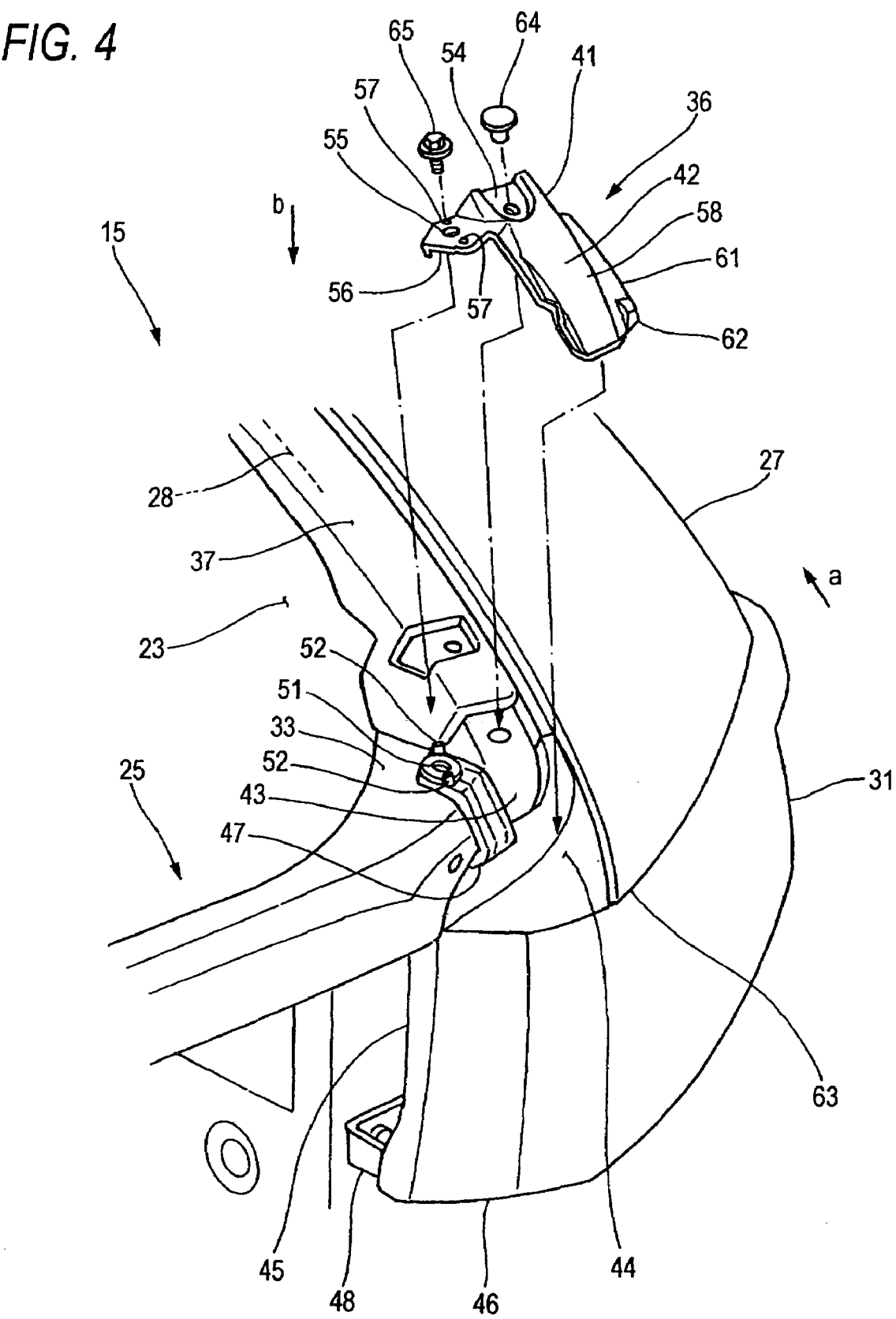
FIG. 4 is a perspective view of the left front end of the front body structure according to this invention.

FIG. 4 is a perspective view of the left front end of the front body structure according to this invention.

Specifically, when viewed in a plan (in a direction of arrow b), in the front body structure 15, V-shape portions 44 are formed at connecting portions 43, 43 (not shown) between the left and right ends 33, 34 (FIG. 2) of the bulk head 25 and the fenders 27, 27 (FIG. 2) so that each of the V-shape portions is covered with the eave 36 extended from the fender 27 and bulk head 25.

The head lamp 31 is formed to reach the side of the fender 27 in such a manner the front corner of the vehicle body is rounded as if it is chamfered, thereby improving the appearance design. In order to assure such an improved design, certain shapes of the left end 33 of the bulk head 25, upper member 23 and fender 27 are required. To this end, the head lamp 31 is provided with a housing 45, a lamp unit 46 attached to the housing 45 and lugs 47, 48 formed in the housing 45 so that they are arranged so as not to interfere with the bulk head 25, upper member 23 and fender 27.

The lug 47 is provided with a slot 51 attached to the left end of the bulk head 25 and positioning convex pieces 52, 52.

The eave 36 includes the fixed portion 41 and the supporting portion 42 linked thereto. At the fixed portion 41, a pin fitting hole 54 is formed in a concave shape and an attaching seat 56 having a slot 55 is also formed. On the attaching seat 56, positioning slots 57, 57 are made. At the supporting portion 42, a sealing portion 58 is formed. A tip support 61 linked with the sealing portion 58 is formed along the back of the fender 27. A hooking convex piece 62 is provided at the tip support 61 so that it is caught by the rear of a fender tip 63.

The eave 36 is made of resin. Reference numeral 63 denotes a fixing pin and 64 denotes a bolt.

Figure 5:
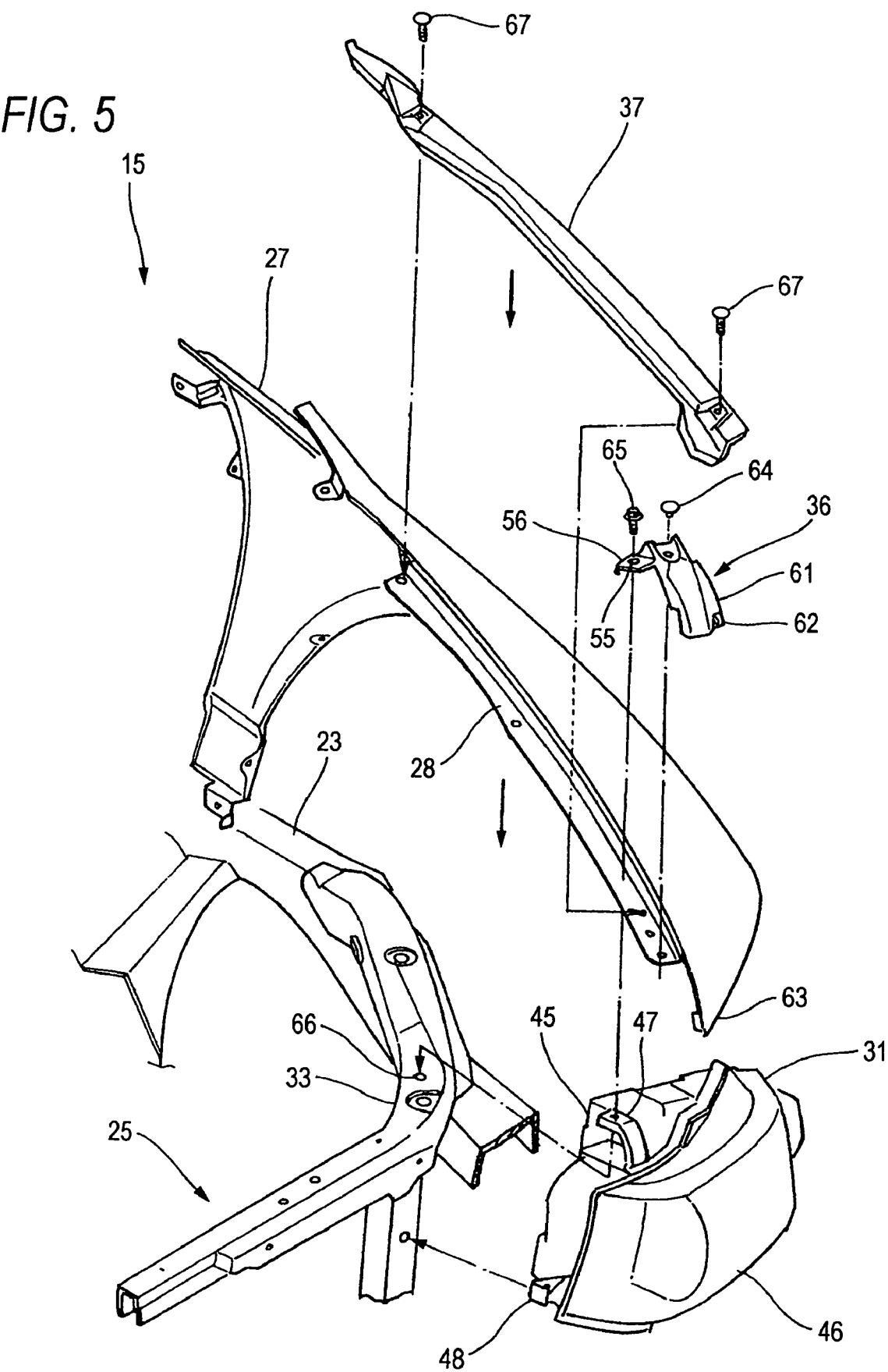
FIG. 5 is an exploded view of the front body structure according to this invention.
Figure 6:
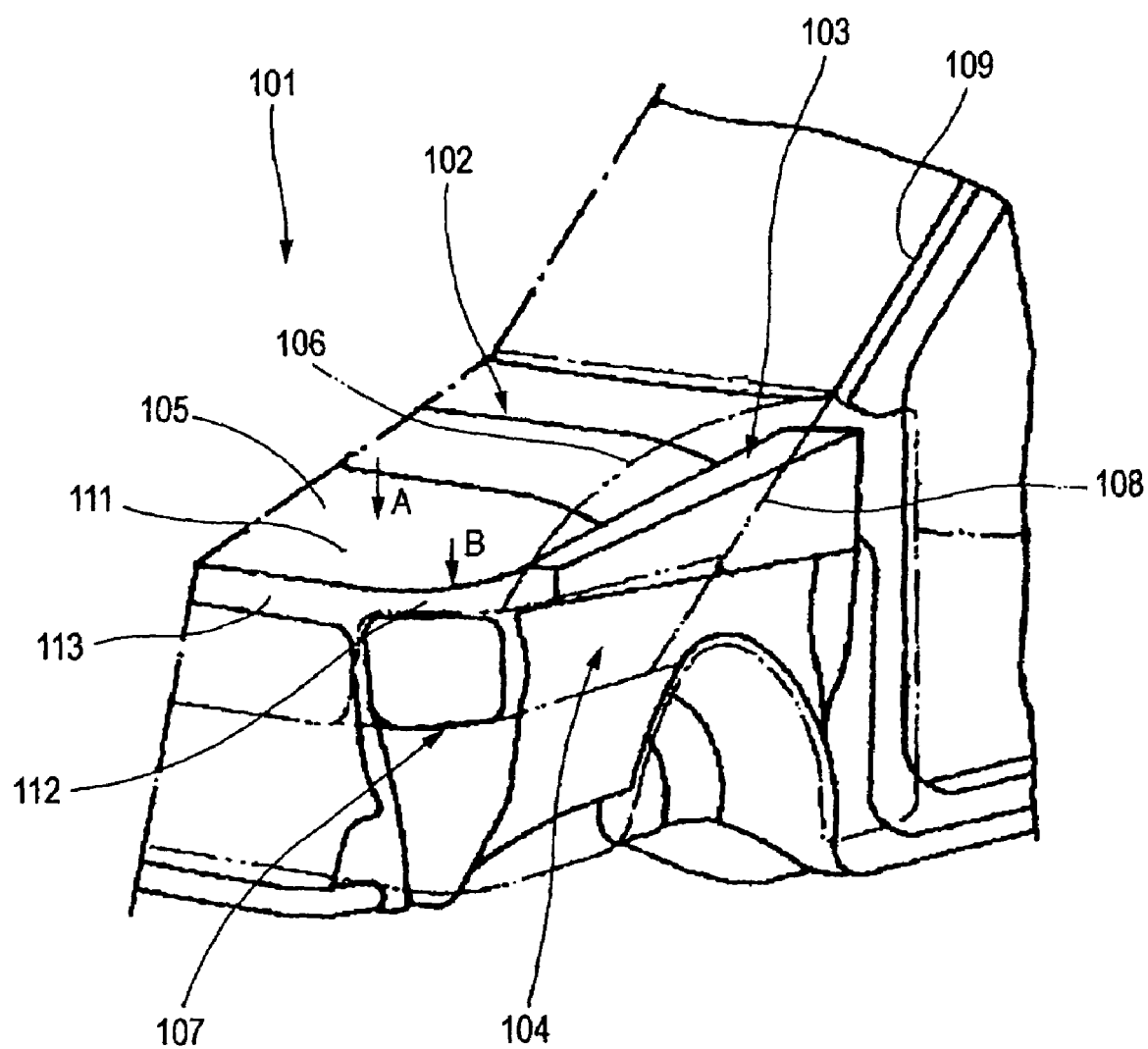
FIG. 6 is a view for explaining the basic configuration of a prior art.

FIG. 5 is an exploded view of the front body structure according to this invention.

An example of the procedure of assembling the front body structure 15 will be explained briefly. First, a cover 37 is attached to the edge 28 of the fender 27 by pins 67, 67. The eave 36 is also attached to the edge 28 by the fixing pins 64. Further, with the tip support 61 of the eave 36 being fit in the rear of the fender 27, the hooking convex 62 of the tip support 61 is anchored the rear of the fender tip 63. On the other hand, the lug 48 of the head lamp 31 is attached to the left side of the bulk head 25 so that the lug 47 is aligned with a female screw 66 at the left end 33 of the bulk head 25. Next, the fender 27 is attached on the side of the upper member 23. In this case, the positioning convexes 52 (FIG. 4), 52 (FIG. 4) of the head lamp 31 on the left end of the bulk head 25 are fit in the positioning slots 57 (FIG. 4), 57 (FIG. 4) of the eave 36 and the attaching seat 56 of the eave 36 is superposed on the lug 47. In this state, the bolt 65 is passed through the slot 55 of the attaching seat 56, thus completing the assembling of the front body structure.

As described above, in the front body structure 15 according to this invention, since the rear of the fender tip 63 is supported by the tip support 61 of the eave 36, the plate thickness of the fender 27 is not increased. In addition, even when the shape corresponding to the head lamp 31 is formed at the left end 33 of the bulk head 25, the rigidity of the fender tips 63, 63 shown in FIGS. 1 and 2 can be assured against the load applied in a direction of arrow c from above in FIG. 1. Thus, the rigidity of the fender tip 63 can be assured in a simple structure without changing the appearance design and plate thickness of the fender 27 of the motor vehicle 27.

Further, in accordance with the front body structure according to this invention, the fixing portion of the eave 36 facilitates positioning between the head lamp 31 and the fender 27. Specifically, the positioning convexes 52 (FIG. 4), 52 (FIG. 4) of the lug 47 of the head lamp 31 attached to the bulk head 25 are fit in the positioning slots 57 (FIG. 4), 57 (FIG. 4) of the eave 36. The position of the fender 27 relative to the head lamp 31 is automatically determined, thereby shortening the working time required for alignment of the fender 27.

Further, in accordance with the front body structure according to this invention, the gap between the fender 27 above the head lamp 31 and the hood 16 is sealed by the sealing portion 58 of the eave 36, thereby preventing invasion of wind during vehicle running. As a result, the hot wind within the engine room 18 does not flow toward the inlet of introducing the outside air of an air conditioner, thereby preventing flow-in of the hot wind.

In addition, the gap between the fender 27 above the head lamp 31 and the hood 16 is sealed by the sealing portion 58 of the eave 36, thereby preventing leakage of light from the gap.

Further, in accordance with the front body structure according to this invention, since the hood 16 located above the head lamp 31 is supported by the eave 36, even if abnormal force is applied when the hood 16 is closed, interference between the hood 16 and the head lamp 31 can be prevented more surely.

Incidentally, although the front body structure of a motor vehicle according to this invention has been applied to a four wheel vehicle in the embodiment described above, it can be applied to a three wheel vehicle and may be applied to a general vehicle.

The front body structure of a motor vehicle according to this invention is preferably adopted in a four wheel vehicle.

What is claimed is:

1. A front body structure comprising:
   a bulk head for supporting a tip of a hood covering an engine room of a motor vehicle, and
   fenders covering an upper part of front wheels, wherein left and right ends of the bulk head, after bent backward of a vehicle body, are connected to the fenders to adjust a shape of a front of the vehicle body by the bulk head, and
   when viewed in a plan, V-shape portions are formed at connecting portions between the ends of the bulk head and the fenders so that each of the V-shape portions is covered with each of eaves extended from the fender and bulk head.

2. The front body structure as in the claim 1, wherein the eaves is made of resin.

* * * * *